United States Patent [19]

Morita

[11] 4,089,902

[45] May 16, 1978

[54] DIALLYLAMINOMETHYL-RESORCINOLS

[75] Inventor: Eiichi Morita, Copley, Ohio

[73] Assignee: Monsanto Company, St. Louis, Mo.

[21] Appl. No.: 412,971

[22] Filed: Nov. 5, 1973

Related U.S. Application Data

[62] Division of Ser. No. 248,067, Apr. 27, 1972, Pat. No. 3,798,051.

[51] Int. Cl.² .............................................. C07C 87/28
[52] U.S. Cl. ..................................... 260/570.9; 260/3; 260/5; 260/51.5
[58] Field of Search ...................................... 260/570.9

[56] References Cited

U.S. PATENT DOCUMENTS

| 2,220,834 | 11/1940 | Bruson et al. ................. 260/570.9 X |
| 3,462,382 | 8/1969 | Kolka et al. ......................... 260/3 |

FOREIGN PATENT DOCUMENTS

| 572,232 | 9/1945 | United Kingdom .............. 260/570.9 |

Primary Examiner—Robert V. Hines

[57] ABSTRACT

Diallylaminomethyl-resorcinol compositions are described which are useful for adhering fiber to rubber.

4 Claims, No Drawings

DIALLYLAMINOMETHYL-RESORCINOLS

This is a division of application Ser. No. 248,067, filed Apr. 27, 1972, now U.S. Pat. No. 3,798,051.

BACKGROUND OF THE INVENTION

This invention relates to compositions and methods for improving the adhesion of fiber to rubber. Particularly it relates to products obtained by the reaction of formaldehyde, diallylamine and resorcinol or resorcinol resins.

Kolka, Tai and Moult, U.S. Pat. No. 3,462,382, disclose the incorporation of resorcinol resin and tris(morpholinomethyl)resorcinol to vulcanizable rubber compositions to increase the adhesion of rubber. This invention comprises in part a novel compound, namely, tris(diallylaminomethyl)resorcinol which enhances the adhesion of fiber to rubber.

SUMMARY OF THE INVENTION

According to this invention the adhesion of fiber to rubber is enhanced by treating the fiber or by adding to the rubber an adhesive enhancing amount of (1) a compound of the formula

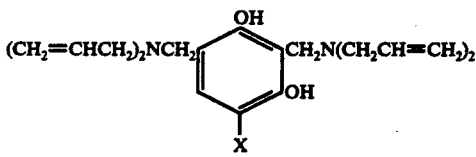

in which X is chloro, bromo, or —CH$_2$N(CH$_2$CH=CH$_2$)$_2$ or (2) a resin obtained by reacting a methylene-donor and diallylamine with an alkylene-resorcinol. The 2,4,6-tris(diallylaminomethyl)resorcinol is prepared by reacting three moles of diallylamine and three moles of methylene-donor with one mole of resorcinol. The 2,6-di(diallylaminomethyl)-4-haloresorcinol is prepared by reacting two moles of diallylamine and two moles of methylene-donor with one mole of 4-haloresorcinol. When an alkylene-bridged resorcinol is reactant, the product is prepared by reacting about one mole of diallylamine and about one mole of methylene-donor with each mole of resorcinol whether free or combined in the alkylene-resorcinol resin.

The term methylene-donor means a compound which forms an aminomethylol radical with diallylamine which methylol intermediate reacts with the resorcinol nucleus forming a methylene bridge between the aromatic and diallylamino moieties. Examples of suitable methylene-donors are paraformaldehyde and formaldehyde.

The term alkylene-resorcinol refers to a resorcinol polymer characterized by nuclear-bridged resorcinol wherein the bridging group comprises an alkylene radical. Resins prepared by the condensation of resorcinol and formaldehyde are suitable which polymers are characterized by methylene-bridging groups. Suitable methylene-resorcinol resins are soluble in common organic solvents and are prepared by condensing either in the absence of catalyst or with an acid catalyst one mole or less of formaldehyde per mole of resorcinol. The preferred amount of formaldehyde is 0.5–0.75 mole per mole of resorcinol. Resins of this type are described in further detail in U.S. Pat. No. 2,385,372.

Preferred polymers are prepared by the acidic condensation of a difunctional olefin with resorcinol which polymers are characterized by a bridging group wherein different carbon atoms of an alkylene radical are attached to the aromatic nucleus. Thus, the bridging group comprises at least two carbon atoms in the chain between the aromatic nuclei not counting carbon atoms pendant to the chain. Alkylene-resorcinol polymers prepared by reaction of 0.5–1.0 moles of olefin per mole of resorcinol are preferred in the practice of this invention. Suitable alkylene-resorcinol polymers are described in greater detail in U.S. Pat. No. 3,644,268 issued Feb. 22, 1972 which disclosure is incorporated herein by reference.

The adhesives of this invention are applied by dipping the fiber into solutions containing the adhesives. The adhesives are insoluble in water but are readily dissolved in common organic solvents. Alcohol, acetone, methyl ethyl ketone and chlorinated hydrocarbons are preferred solvents. The concentration of the adhesive in the dip solution is not critical so long as there is enough adhesive present to coat the fiber. Five percent solutions are usually adequate for normal dip times, however, for best overall performance, it is recommended that about 20% solutions be used. One feature of the adhesives of this invention is that no heat treatment is required after coating the fiber which is an important advantage for fibers which are degraded by heat. The adhesive coated fiber may be incorporated in rubber and the rubber vulcanization temperature is sufficient to form the bond with the rubber.

The adhesives may also be added directly to the rubber to improve adhesion. For example, brass-plated metal composites exhibit improved adhesion, particularly improved aged adhesion, when made from rubber containing adhesives of this invention. When making synthetic fiber composites, it is preferred that the fibers be coated with an alkylene-resorcinol resin in addition to adding the subject adhesives to the rubber. It is understood that the invention is not limited to filaments but is also applicable to massive substrates, for example, the adhesives are suitable for bonding rubber to metal plates.

The invention is applicable to textile fibers commonly used for rubber reinforcement, such as cotton, rayon, nylon, polyester, and metal fibers. The adhesives are especially recommended for adhering metal fibers to rubber. Suitable metals are carbon steel, stainless steel, aluminum, copper, brass, brass-plated steel, and aluminum-steel alloy. British Pat. No. 1,153,577 describes aluminum-steel alloy fibers with which the adhesives of this invention are particularly useful. With metal fibers, it is preferred that the (diallylaminomethyl)resorcinols of this invention be used conjointly with resorcinol-resin. The resorcinol-resin employed as adhesive adjuvants may be present in the rubber stock or may be applied directly to the fiber. When applying the resorcinol-resin to the fiber it is convenient to apply both components at once by including the resin in the (diallylaminomethyl)resorcinol solution. However, they each may be applied separately and equally good adhesion is obtained. Examples of satisfactory resorcinol-resins are the alkylene-resorcinol polymers previously mentioned.

The new adhesives enhance adhesion of fiber to any sulfur-vulcanizable diene rubber. Natural and synthetic rubbers and mixtures thereof are suitable. Synthetic rubbers include cis-4-polybutadiene, butyl rubber, ethylene-propylene terpolymers, polymers of 1,3-butadiene, polymers of isoprene, copolymers of 1,3-butadiene with other monomers, for example, styrene, acrylonitrile, isobutylene and methylmethacrylate. Of course, the usual compounding ingredients may be components of the rubber compositions.

DESCRIPTION OF THE PREFERRED EMBODIMENTS

The adhesives of this invention are prepared by the conventional Mannich reaction wherein formaldehyde and amine are condensed with a phenol to give an aminomethylphenol. The methylol amine intermediate is preferably prepared separately prior to reaction with the resorcinol. Suitable procedures are illustrated below.

EXAMPLE 1

Solution A is prepared by heating for one hour at 55° C a mixture of paraformaldehyde 9.0 g (0.3 mole) and diallylamine 29.1 g (0.3 mole) in 20 ml of isopropanol. Solution A is added to a solution of resorcinol 11.0 g (0.1 mole) in 50 ml of isopropanol, and the mixture is heated for 1.5 hours at 45°–55° C. The solvent is removed by evaporation under vacuum to give 41.8 grams of an amber liquid. The liquid product is dissolved in ether, washed with water and dried over sodium sulfate. The ether is evaporated in vacuo to give 2,4,6-tris(diallylaminomethyl)resorcinol. Analysis gives 9.44% N compared to 9.60% calculated for $C_{27}H_{39}N_3O_2$. Identification is confirmed by nuclear magnetic resonance spectral analysis.

EXAMPLE 2

Solution A, prepared in the same manner as above, is added to a solution of 4-chlororesorcinol 21.7 g (0.15 mole) in 50 ml of isopropanol at 53° C. The temperature rises to 68° C upon the addition of Solution A. The mixture is allowed to cool and the temperature is maintained between 53°–58° C for 1.5 hours. The crude product is recovered by evaporation of the isopropanol and the residue dissolved in ether, washed with water three times and dried over sodium sulfate. The ether is removed in vacuo to give 49.3 grams of 2,6-di(diallylaminomethyl)-4-chlororesorcinol, a dark brown liquid. Identification is confirmed by nuclear magnetic resonance spectral analysis. Chemical analysis gives 6.91% N and 9.03% Cl compared to 7.72% N and 9.77% Cl calculated for $C_{20}H_{27}ClN_2O_2$.

EXAMPLE 3

Alkylene-resorcinol polymers of U.S. Pat. No. 3,644,268 are prepared by reacting an olefinic alcohol or halide with resorcinol. Typically, alkylene-resorcinol resins are prepared by adding dropwise over a period of 50–90 minutes 43.5 g of allyl alcohol to a mixture comprising 110 g of resorcinol and 1–8 g of acid catalyst (conc. HCl or $H_2SO_4$). The mixture is heated at 100°–120° C for 2–4 hours. When HCl is used as catalyst, the reaction mass is vacuum stripped at about 150° C and 30 mm Hg. When $H_2SO_4$ is used, the reaction mass is neutralized by caustic addition before stripping. Brittle resins are obtained (yield 125–145 g) having an average number molecular weight between 700–850 with the higher molecular weight products obtained when larger quantities of catalyst are used. The resins contain about 17–24 percent free resorcinol. The same resins may be prepared by reacting a mole of allyl chloride with a mole of resorcinol in an inert solvent at 100°–120° C. When an olefinic halide is used as reactant no acid catalyst is required.

EXAMPLE 4

Solution A, prepared in the same manner as above, is added to a solution of 45 g of the alkylene-resorcinol resin of Example 3 (containing about 0.3 mole of resorcinol) in about 100 ml of isopropanol and the mixture is heated for 1.5 hours at about 60° C. The mixture is concentrated by evaporation to give a 50% isopropanol solution of the reaction product of alkylene-resorcinol and diallylamine methylol. The solution is ready to use as a tire cord dip solution or may be further diluted as desired. For example, in the tests illustrated in Tables I, II and III, the solution is diluted to give a 20% solution. Although solutions prepared at other reactant ratios exhibit adhesive qualities, the preferred solutions are prepared with the amount of diallylamine methylol between 0.9–1.15 moles per mole of resorcinol in the alkylene-resorcinol polymer.

EXAMPLE 5

The procedure of Example 4 is repeated using Penacolite Resin B-18 an alkylene-resorcinol resin prepared by condensing formaldehyde and resorcinol.

The bonding of metal fibers to rubber with the adhesive compositions of this invention is illustrated below. The fibers are dipped into 20% by weight of the adhesive dissolved in organic solvent. The amount of adhesive retained on the fiber is between 0.2–4% but usually between 1–2.5%. The treated fibers are then embedded in vulcanizable rubber and the specimen vulcanized. The force required to pull the fibers from the vulcanized rubber is determined on an Instron tensile tester using an H-test specimen. The H-test specimens are prepared by embedding the dipped cord in rubber which is placed in an H-test vulcanization mold having rubber strip channels ⅜-inch wide by 0.1 inch deep and separated from one another by ¼-inch. The test specimens are heated in the mold at 145° or 153° C for the time required to achieve optimum cure as determined from rheometer data for the particular rubber stock used. After vulcanization, the test specimens are removed from the mold, cooled to room temperature and permitted to relax or to set for 24 hours. The specimens are then heated to 100° C, the temperature at which the force required to separate the cord from the rubber is measured. An unaged specimen is one which is heated 1 hour at 100° C before making the measurement whereas an aged specimen is one which is heated 24 hours at 100° C before making the measurement.

A natural rubber masterbatch used to illustrate the invention contains the following ingredients: 100 parts natural rubber, 60 parts HAF carbon black, one part stearic acid, 5 parts zinc oxide, 3 parts hydrocarbon softener and 1 part polymerized quinoline antidegradant. Prior to preparing the test specimens, 0.6 part N-tert-butyl-2-benzothiazolesulfenamide accelerator and 3 parts sulfur are milled into the masterbatch.

Specimens prepared with 1 × 6 × 0.006 carbon steel tire cord and the above masterbatch cured at 145° C for 35 minutes give the adhesion values shown in Table I. Stock 1 is a control with untreated cord. Stocks 2, 3 and 4 illustrate the adhesion values obtained for the cords treated with the adhesives of Examples 1, 2 and 3, respectively. Stocks 5 and 6 show the adhesion obtained with 1/1 mixtures of alkylene-resorcinol and the adhesives of this invention.

TABLE I

| Stock No. | Adhesive Dip 20% Solution | H-Adhesion/Lbs Unaged | Aged |
|---|---|---|---|
| 1 | None - Bare Cord | 1.8 | — |
| 2 | 2,4,6-tris(diallylamino-methyl)resorcinol (Ex. 1) | 9.2 | 11.7 |
| 3 | 2,6-di(diallylaminomethyl)-4-chlororesorcinol (Ex. 2) | 19.7 | 24.0 |
| 4 | Alkylene-resorcinol of Example 3 | 5.6 | 9.1* |
| 5 | 1/1 Mixture of Examples 1 & 3 | 36.1 | 28.7* |
| 6 | 1/1 Mixture of Examples 2 & 3 | 26.5 | 24.0* |

*Aged 48 hours instead of 24 hours.

The data show substantial improvement of adhesion of metal-to-rubber with the compounds of this invention when used alone and that better results are obtained when used conjointly with alkylene-resorcinol polymer. When the experiment is repeated with 1 × 12 × 0.006 steel tire cord, the adhesive values for Stock 5 are 26.5 pounds unaged and 25.8 pounds aged. The adhesive values with a 20% adhesive dip of Example 5 are 19.1 pounds unaged and 26.0 pounds aged and with a 1/1 mixture of 2,4,6-tris(diallylaminomethyl)resorcinol and Penacolite Resin B-18 are 24.6 unaged and 29.8 aged. In a similar test using an adhesive dip comprising a 1/1 mixture of alkylene-resorcinol of Example 3 and tris(morpholinomethyl)resorcinol of U.S. Pat. No. 3,462,382, adhesive values of 13.9 pounds unaged and 21.5 pounds aged are obtained.

The invention is illustrated in Table II using 3 × 7 × 0.004 aluminum-steel alloy tire cord and a synthetic rubber blend masterbatch. The masterbatch contains the following ingredients: 50 parts natural rubber, 68.8 parts oil-extended synthetic styrene-butadiene rubber, 50 parts carbon black, 2 parts stearic acid and 3 parts zinc oxide. Prior to preparing the test specimens, one part N-tert-butyl-2-benzothiazolesulfenamide accelerator and 2 parts sulfur are milled into the masterbatch. The specimens are cured at 153° C for 35 minutes.

TABLE II

| Stock No. | Adhesive Dip 20% Solution | H-Adhesion/Lbs. Unaged |
|---|---|---|
| 1 | Alkylene-resorcinol of Ex. 3 | 3.5 |
| 2 | 2,4,6-tris(diallylaminomethyl)-resorcinol (Example 1) | 11.9 |
| 3 | 2,6-di(diallylaminomethyl)-4-chlororesorcinol (Example 2) | 18.1 |
| 4 | 1/1 Mixture of Examples 1 & 3 | 22.2 |
| 5 | Adhesive of Example 4 | 21.8 |

Stocks 4 and 5 illustrate that the adhesion obtained when the alkylene-resorcinol is chemically combined with the diallylamino methylol forming a reaction product, is essentially the same as obtained with a mixture of alkylene-resorcinol and 2,4,6-tris(diallylaminomethyl)-resorcinol. When the experiment of Stock 2 is repeated with 2.5 parts alkylene-resorcinol of Example 3 added to the rubber, an adhesion value of 25.3 pounds is obtained. A control with untreated cord gave only 3.1 pounds.

The invention is illustrated further using 3 × 7 × 0.004 aluminum-steel alloy tire cord and a three component rubber masterbatch. The masterbatch contains the following ingredients: 55 parts natural rubber, 41.25 parts oil-extended synthetic styrene-butadiene rubber, 15 parts polybutadiene rubber, 45 parts GPF carbon black, 5 parts precipitated silica, 5 parts softener oil, 2 parts tackifier, 1.5 parts polymerized quinoline antidegradant, one part resorcinol, one part hexamethoxymethyl-melamine, one part stearic acid and 5 parts zinc oxide. Before use, 0.2 parts N-(cyclohexylthio)phthalimide (scorch inhibitor), 0.8 parts benzothiazolyl disulfide, 0.3 parts N-tert-butyl-2-benzothiazolesulfenamide and 2.5 parts insoluble sulfur are milled into the masterbatch. The specimens are cured at 153° C for 35 minutes. The results are tabulated in Table III.

TABLE III

| Stock No. | Adhesive Dip 20% Solution | H-Adhesion/Lbs. Unaged |
|---|---|---|
| 1 | Alkylene-resorcinol of Ex. 3 | 9.9 |
| 2 | 2,4,6-tris(diallylamino-methyl)resorcinol (Ex. 1) | 30.6 |
| 3 | 2,6-di(diallylaminomethyl)-4-chlororesorcinol (Ex. 2) | 27.4 |
| 4 | 1/1 Mixture of Examples 1 & 3 | 26.2 |
| 5 | Adhesive of Example 4 | 25.2 |

The new adhesives also enhance the adhesion of synthetic fibers to rubber. For example, an untreated polyester 1000/3 tire cord in a specimen prepared using the stock of Table II gives an H-adhesion value of 2.9 pounds. Polyester cords treated with 2,4,6-tris(diallylaminomethyl)resorcinol and the reaction product of Example 4 give H-adhesion values of 7.5 and 11.1 pounds, respectively.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The composition of the formula

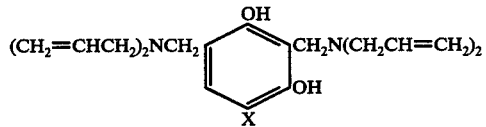

in which X is chloro, bromo or $-CH_2N(CH_2CH=CH_2)_2$.

2. The composition of claim 1, wherein X is chloro.
3. The composition of claim 1, wherein X is bromo.
4. The composition of claim 1, wherein X is $-CH_2N(CH_2CH=CH_2)_2$.

* * * * *